United States Patent
Shim

(10) Patent No.: US 7,125,363 B2
(45) Date of Patent: Oct. 24, 2006

(54) CONTROL METHOD FOR SUPPRESSING BLOW-UP PHENOMENON DURING POWER-ON 2-3 UPSHIFT OF AUTOMATIC TRANSMISSION

(75) Inventor: Hyun Soo Shim, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 170 days.

(21) Appl. No.: 11/001,607

(22) Filed: Dec. 1, 2004

(65) Prior Publication Data

US 2005/0143222 A1   Jun. 30, 2005

(30) Foreign Application Priority Data

Dec. 30, 2003   (KR)   .................... 10-2003-0100946

(51) Int. Cl.
  *B60W 10/04*   (2006.01)
(52) U.S. Cl. .................................................... 477/107
(58) Field of Classification Search .................. 701/54; 477/107
  See application file for complete search history.

(56) References Cited

U.S. PATENT DOCUMENTS 5,168,777 A * 12/1992 Isono et al. ................. 477/152

6,540,643 B1 * 4/2003 Ohtsuka ....................... 477/83

FOREIGN PATENT DOCUMENTS

| JP | 05-033858 | 9/1993 |
| JP | 2000-213389 | 2/2000 |

* cited by examiner

*Primary Examiner*—Dirk Wright
(74) *Attorney, Agent, or Firm*—Morgan Lewis & Bockius LLP

(57) ABSTRACT

A control method for suppressing a blow-up phenomenon during a power-on 2-3 upshift is provided. Disclosed steps include determining whether a predetermined shift compensation control entrance condition exists, determining whether a blow-up occurs if it is determined that the predetermined shift compensation control entrance condition exists, calculating an amount of the blow-up if it is determined that the blow-up occurs, performing a hydraulic duty compensation for an off-going friction element based on the amount of the blow-up, and performing an engine torque compensation based on a transmission output shaft rpm and a turbine torque. A system employing the method is also disclosed.

4 Claims, 2 Drawing Sheets

CONTROL METHOD FOR SUPPRESSING BLOW-UP PHENOMENON DURING POWER-ON 2-3 UPSHIFT OF AUTOMATIC TRANSMISSION

CROSS REFERENCE TO RELATED APPLICATIONS

This application claims priority of Korean Application No. 10-2003-0100946, filed on Dec. 30, 2003, the disclosure of which is incorporated herein by reference.

Technical Field of the Invention

The present invention relates to a control method for suppressing blow-up phenomenon during a power-on 2-3 upshift of an automatic transmission.

BACKGROUND OF THE INVENTION

Generally, a phenomenon that an engine rpm or a turbine rpm increases abruptly due to a delay in an increase of hydraulic pressure, which is caused by a shortage of hydraulic pressure in a hydraulic pressure control line in an automatic transmission of a vehicle, is generally referred to as a blow-up phenomenon. For example, during a power-on 2-3 upshift, if hydraulic pressure for off-going friction element, which is to be released in a target shift ratio, is previously released in a state that hydraulic pressure for on-coming friction element, which is going to be engaged in a target shift ratio, is not sufficiently increased to a level in which the on-coming friction element is able to cover an input torque, a turbine rpm may abruptly increase.

In order to prevent such blow-up phenomenon, a compensation is generally performed with respect to the hydraulic pressure acting on the on-coming friction element.

However, when there is an excessive blow-up, such conventional hydraulic pressure compensation is not sufficient for suppressing the blow-up phenomenon. In addition, if an additional shift control for suppressing the blow-up phenomenon is performed, an overall shift control becomes complex and an unexpected shift shock may occur.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a control method for suppressing a blow-up phenomenon by performing a hydraulic duty compensation for an off-going friction element and an engine torque compensation.

In a preferred embodiment of the present invention, a control method for suppressing a blow-up phenomenon during a power-on 2-3 upshift comprises: determining whether a predetermined shift compensation control entrance condition exists; determining whether a blow-up occurs, if it is determined that the predetermined shift compensation control entrance condition exists; calculating an amount of the blow-up, if it is determined that the blow-up occurs; performing a hydraulic duty compensation for an off-going friction element based on the amount of the blow-up; and performing an engine torque compensation based on a transmission output shaft rpm and a turbine torque.

In another embodiment of the present invention, it is determined that the predetermined shift compensation control entrance condition exists: if an automatic transmission fluid temperature is lower than a predetermined temperature; if a current 2-3 upshift is a first 2-3 upshift after an ignition ON; if a vehicle has started after a state that a transmission output shaft rpm is "0" in a neutral N range or in a parking P range maintained for more than a predetermined time; or if a vehicle has started after a state that a transmission output shaft rpm is "0" in a driving D range and in a brake switch ON state of a brake switch maintained for more than a predetermined time.

In a further embodiment of the present invention, the performing of the hydraulic duty compensation compensates a hydraulic duty of an off-going friction element by a hydraulic duty compensation value proportional to the amount of the blow-up.

In a still further embodiment of the present invention, the performing of the engine torque compensation compensates an engine torque by an engine torque compensation value proportional to both the transmission output shaft rpm and the turbine torque.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 2:
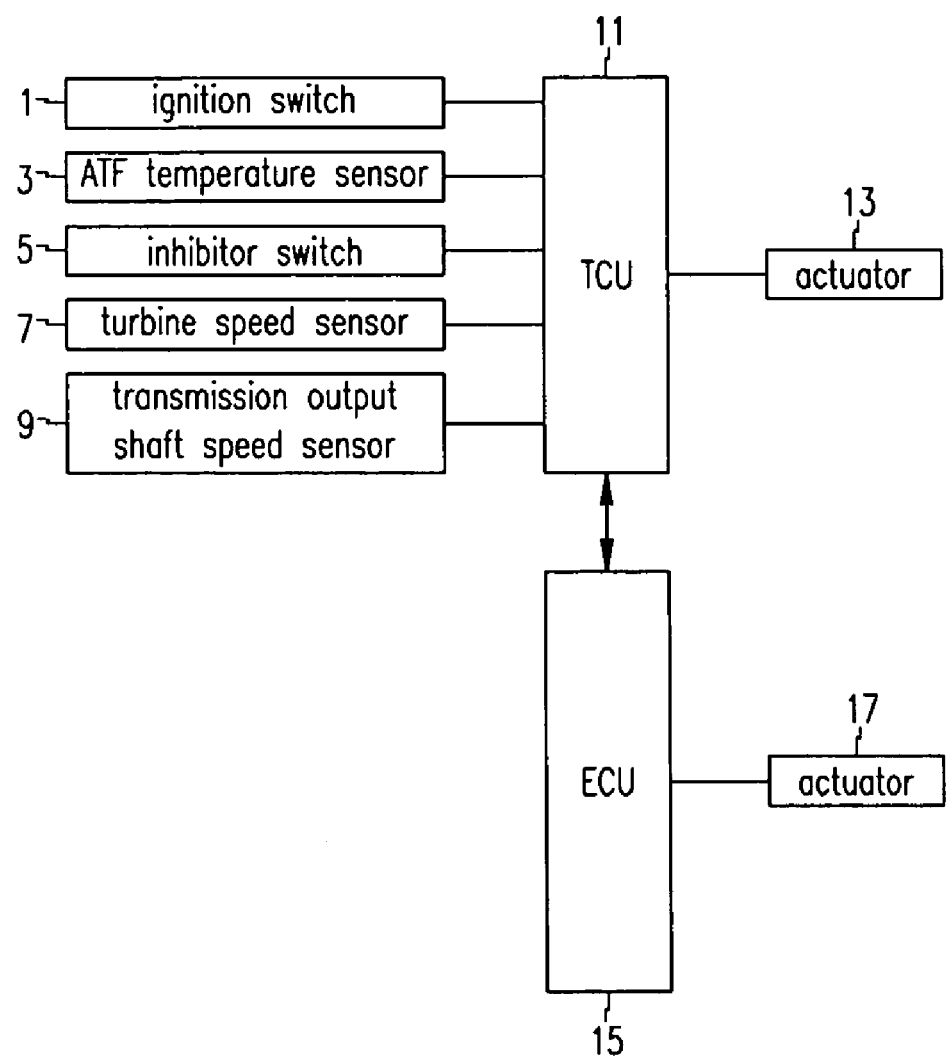
FIG. 2 is a block diagram of a system according to an embodiment of the present invention.

A system according to an embodiment of the present invention may include, as shown in FIG. 2, an ignition switch 1 for generating an ignition ON signal or an ignition OFF signal, an ATF temperature sensor 3 for detecting an automatic transmission fluid temperature, an inhibitor switch 5 for detecting a current shift range, a turbine speed sensor 7 for detecting a turbine speed (rpm), a transmission output shaft speed sensor 9 for detecting a transmission output shaft speed (rpm), a transmission control unit (TCU) 11 connected to the sensors 1, 3, 5, 7 and 9 to receive signals therefrom, an actuator 13 for realizing a hydraulic duty for an off-going friction element under the control of the TCU 11, an engine control unit (ECU) 15, and an actuator 17 for realizing an engine torque reduction under the control of the ECU 15.

The TCU 11 and ECU 15 may each comprise one or more processors, memory and associated hardware and software as my be selected and programmed by a person of ordinary skill in the art based on the teachings herein.

The TCU 11 calculates an amount of a blow-up using the signal of the turbine speed sensor 7, and generates a control signal for controlling the actuator 13 to perform a hydraulic duty compensation for an off-going friction element. In addition, the TCU 11 determines whether an engine torque reduction control is needed, on the basis of signals input from the above-stated sensors, and outputs a corresponding signal to the ECU 15. Then, the ECU 15 generates a control signal for controlling the actuator 17 to perform a corresponding engine torque reduction control.

At first, at step S10, it is determined whether a predetermined shift compensation control entrance condition exists.

For example, it is determined that the predetermined shift compensation control entrance condition exists: 1) if an automatic transmission fluid temperature is lower than a predetermined temperature (e.g., 45; 2) a current 2-3 upshift is a first 2-3 upshift after an ignition ON; 3) a vehicle has started after a state that a transmission output shaft rpm is "0" in a neutral N range or in a parking P range maintained for more than a predetermined time (e.g., 300 seconds); or 4) a vehicle has started after a state that a transmission output shaft rpm is "0" in a driving D range and in an ON state (that is, a state of a brake operation) of a brake switch maintained for more than a predetermined time (e.g., 300 seconds).

Figure 1:
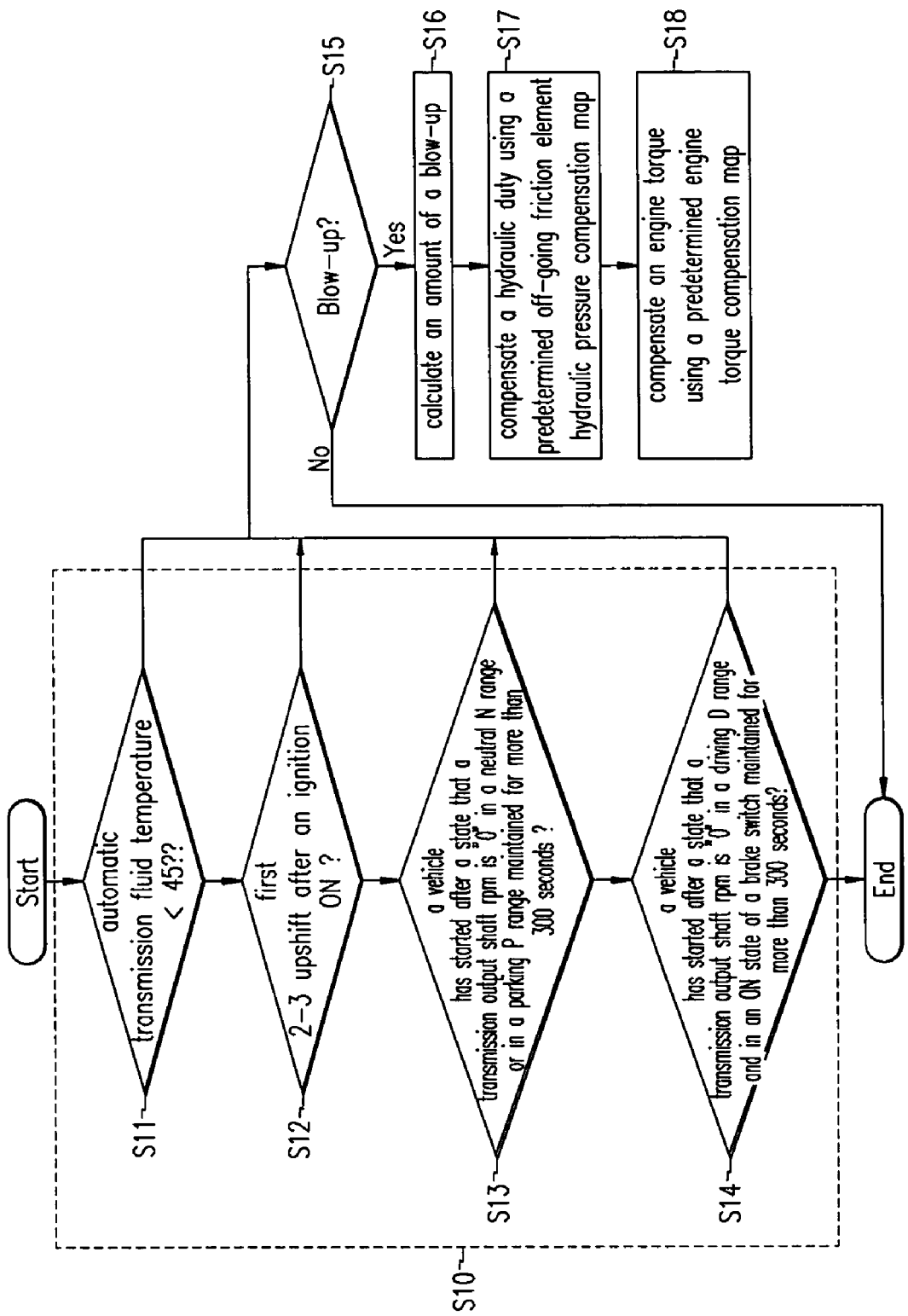
FIG. 1 is a flow chart showing a control method for suppressing a blow-up phenomenon during a power-on 2-3 upshift for an automatic transmission according to an embodiment of the present invention.

For example, as shown in FIG. 1, at step S11, it is determined whether an automatic transmission fluid temperature is lower than 45. Then, it is determined whether a current 2-3 upshift is a first 2-3 upshift after an ignition ON, at step S12. Further, it is determined whether a vehicle has started after a state that a transmission output shaft rpm is "0" in a neutral N range or in a parking P range maintained for more than 300 seconds, at step S13. Then, at step S14, it is determined whether a vehicle has started after a state that a transmission output shaft rpm is "0" in a driving D range and in an ON state of a brake switch maintained for more than 300 seconds.

If it is determined that at least one condition in from step S11 to step S14 exists, it is determined that a blow-up occurs at step S15. As stated in the above, the blow-up means a phenomenon of an abrupt increase of an engine rpm or a turbine rpm caused by an insufficient filling of hydraulic pressure in a hydraulic pressure control line. For example, if a changing state of a turbine rpm changes from a decreasing state to an increasing state during a power-on 2-3 upshift, it can be determined that there is a blow-up.

Then, if it is determined that there is a blow-up in step S15, an amount of the blow-up is calculated at step S16. For example, the amount of the blow-up can be determined as a value calculated by a difference between a reference turbine rpm and a current turbine rpm. The reference turbine rpm may be a value calculated by a current transmission output shaft rpm and a gear ratio of a second shift speed. That is, the amount of the blow-up can be calculated as a value corresponding to an amount of an abnormal increase of a turbine speed.

Then, a compensation of a hydraulic duty for an off-going friction element is performed according to the calculated amount of the blow-up. The off-going friction element is a friction element that is engaged in a second shift speed and is going to be disengaged in a third shift speed. For example, the compensation of the hydraulic duty for the off-going friction element can be performed using a predetermined off-going friction element hydraulic pressure compensation map that includes compensation duties determined with respect to amounts of blow-up. The predetermined off-going friction element hydraulic pressure compensation map may be realized as a first-order map including compensation duties with respect to amounts of blow-up, and the compensation duty is preferably set to be approximately proportional to an amount of a blow-up. That is, a compensation value of a hydraulic duty for the off-going friction element corresponding to the amount of the blow-up is calculated using the predetermined off-going friction element hydraulic pressure compensation map, and a hydraulic duty of the off-going friction element is compensated by the calculated compensation value.

By compensating the hydraulic duty of the off-going friction element by the compensation duty value proportional to the amount of the blow-up, a disengagement of the off-going friction element is delayed so that an abrupt increase of a turbine rpm can be prevented.

Then, at step S18, an engine torque compensation is performed based on a transmission output shaft rpm and a turbine torque. For example, the engine torque compensation can be performed using a predetermined engine torque compensation map. The predetermined engine torque compensation map can be realized as a second-order map including engine torque compensation values determined with respect to turbine torques and transmission output shaft rpms, and the engine torque compensation value is preferably set to be approximately proportional to both the transmission output shaft rpm and the turbine torque. That is, an engine torque compensation value corresponding to a current transmission output shaft rpm and a turbine torque is calculated using the predetermined engine torque compensation map, and an engine torque is compensated by the calculated engine torque compensation value.

By compensating an engine torque by the engine torque compensation value proportional to the transmission output shaft rpm and the turbine torque, an engine torque can be reduced so that an abrupt increase of an engine rpm caused by the blow-up can be prevented.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A control method for suppressing a blow-up phenomenon during a power-on 2-3 upshift, comprising:
   determining whether a predetermined shift compensation control entrance condition exists;
   determining whether a blow-up occurs, if it is determined that the predetermined shift compensation control entrance condition exists;
   calculating an amount of the blow-up, if it is determined that the blow-up occurs;
   performing a hydraulic duty compensation for an off-going friction element based on the amount of the blow-up; and
   performing an engine torque compensation based on a transmission output shaft rpm and a turbine torque.

2. The control method of claim 1, wherein it is determined that the predetermined shift compensation control entrance condition exists: if an automatic transmission fluid temperature is lower than a predetermined temperature; if a current 2-3 upshift is a first 2-3 upshift after an ignition ON; if a vehicle has started after a state that a transmission output shaft rpm is "0" in a neutral N range or in a parking P range maintained for more than a predetermined time; or if a vehicle has started after a state that a transmission output shaft rpm is "0" in a driving D range and in a brake switch ON state of a brake switch maintained for more than a predetermined time.

3. The control method of claim 1, wherein the performing of the hydraulic duty compensation compensates a hydraulic duty of an off-going friction element by a hydraulic duty compensation value proportional to the amount of the blow-up.

4. The control method of claim 1, wherein the performing of the engine torque compensation compensates an engine torque by an engine torque compensation value proportional to both the transmission output shaft rpm and the turbine torque.

* * * * *